April 26, 1932.  M. L. MARTUS  1,855,917
SUPPORTING MEANS FOR COMPRESSED OXIDE OF COPPER BATTERY ELECTRODES
Original Filed March 21, 1925
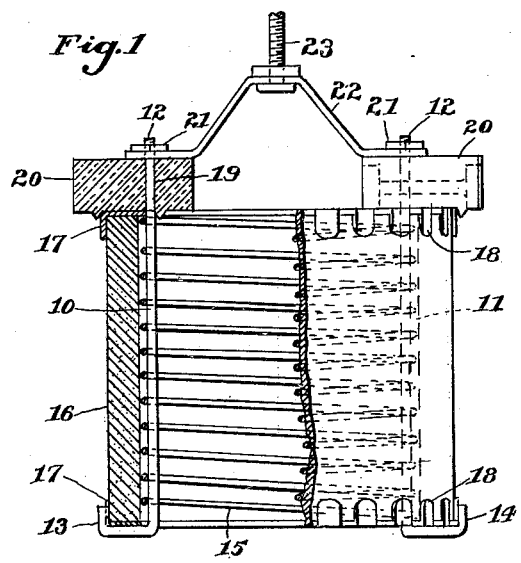
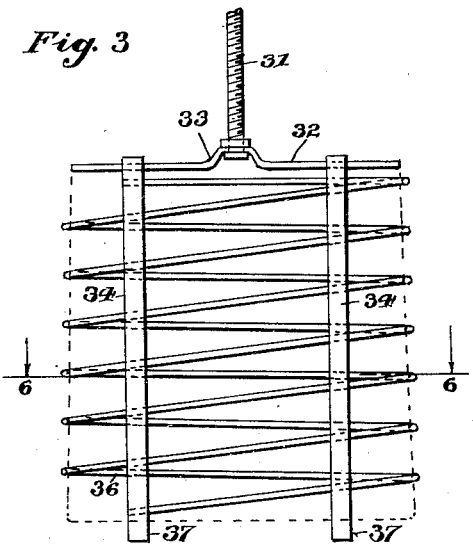
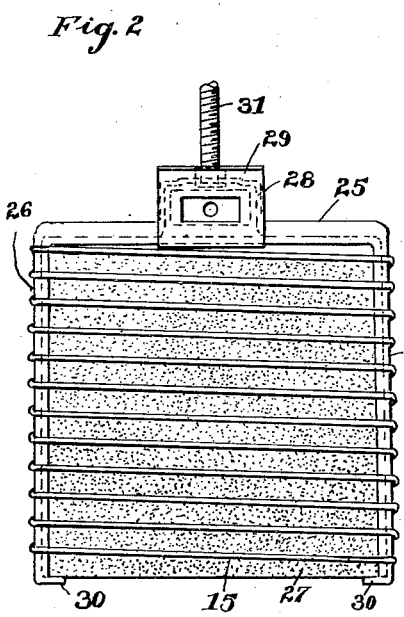
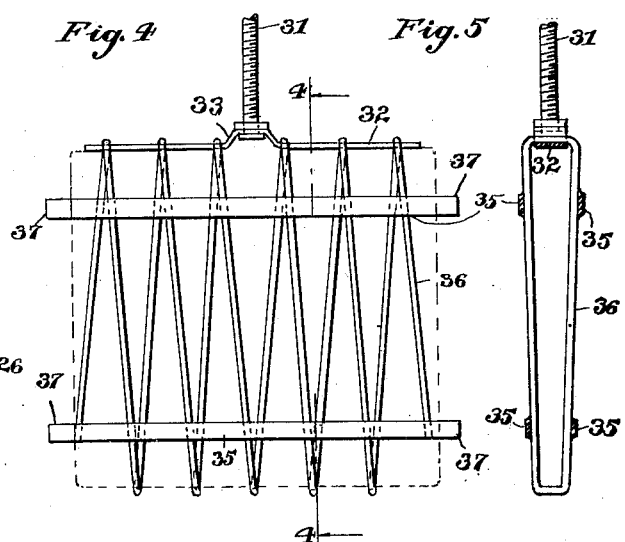
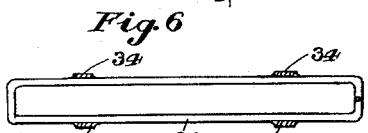
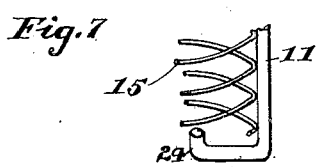
INVENTOR.
Martin L. Martus
BY
Chamberlain & Newman
ATTORNEYS.

Patented Apr. 26, 1932

1,855,917

UNITED STATES PATENT OFFICE

MARTIN L. MARTUS, OF WOODBURY, CONNECTICUT

SUPPORTING MEANS FOR COMPRESSED OXIDE OF COPPER BATTERY ELECTRODES

Continuation of application Serial No. 17,243, filed March 21, 1925. This application filed November 12, 1928. Serial No. 318,633.

The present invention relates to primary batteries, and more particularly to the supporting means for the compressed oxide of copper, negative electrodes therefor, and is a continuation of my prior invention filed March 21, 1925, Serial No. 17,243. This type of negative electrode is formed from finely ground oxide of copper scale, which is pressed into form and baked hard, and then arranged with the co-acting positive or zinc electrodes, and suspended within a jar filled with a proper active solution, which in practice effects the materials of the two electrodes. These negative electrodes swell, disintegrate, crumble and flake more or less, in the operation of the battery, which is objectionable; furthermore these electrodes are very brittle and subject to breakage during handling and shipping.

At present the use of batteries of this general character are very expensive, which is primarily due to the manner in which they are constructed and the parts assembled, the construction being such as to prohibit a practical separation of the electrode from its support, so that when the electrode has spent its life, or for any other reason no longer possesses utility, the entire battery as a unit must be discarded. The construction does not permit of a renewal or substitution of the electrode from time to time on a practical and economic basis, and consequently the supporting means can only be used with the original electrode.

Broadly stated, it is therefore the primary object of the present invention to provide a supporting means for the electrode of such batteries, which not only serves to protect the electrode in a manner to reduce to a minimum the possibility of the latter becoming broken, crumbling or the like, but which also permits the electrode to be quickly and conveniently removed therefrom, when its use is no longer desired and a renewal of substitute electrode arranged in its place, thus effecting a great saving, since the supporting means can be used indefinitely with others than the original electrode, which may be substituted from time to time.

The invention further contemplates a supporting means designed to overcome the foregoing difficulties, in that it protects the vertical operative sides or faces of the electrode, so as to properly retain it in form, even though it becomes cracked or broken, and at the same time leave all of the operative surfaces of the electrode exposed to the solution and the co-acting element.

Another object of the invention resides in the provision of such supporting and protective means, which will in no way impair the efficiency of the electrode, but which, on the other hand, will provide a more positive connection or contact between the electrode and its conductive supporting means.

In carrying out the invention I comprehend an electrode support designed to permit of a quick and ready separation of the negative electrode therefrom, and its replacement by a new electrode from time to time as the occasion may require.

More specifically stated the invention comprehends the provision of an electrode support in the nature of an article of manufacture, that can be produced and sold at a nominal cost, and designed to permit of its use with renewal or substitute electrodes from time to time.

With the above and other objects in view, embodiments of the invention are shown in the accompanying drawings, and these embodiments will be hereinafter more fully described with reference thereto, and the invention pointed out in the appended claims.

In the drawings:

Fig. 1 shows a perspective view of a cylindrical form of my invention, adapted to accommodate compressed cylindrical forms of copper oxide electrodes;

Fig. 2 shows a side elevation of a modified form of my improved electrode support with a plate form of electrode contained therein;

Fig. 3 is a side elevation of a different form of plate electrode support;

Fig. 4 is another side view of a further modified plate form of the invention;

Fig. 5 is a vertical cross section taken on line 4—4 of Fig. 3;

Fig. 6 shows a horizontal cross section taken on line 6—6 of Fig. 3, and

Fig. 7 shows a fragmentary perspective view of a modified form of the invention, illustrating an outside support for cylindrical electrode.

In the preferred embodiment of the invention I have illustrated an electrode supporting means in the nature of a frame designed to slidably and removably support the electrode, so that the latter can be replaced by renewal or substitute electrodes from time to time as the occasion may require. The frame has also been designed as a protective means for the electrode, with a view of minimizing the possibility of injury to the latter, as well as to maintain the electrode in its proper form, even though it becomes cracked or broken due to handling, shipping or for any other reason.

In one embodiment of the invention, see Fig. 1, I have illustrated a supporting frame designed to accommodate itself to electrodes of cylindrical contour in cross section, while in other embodiments of the invention I have illustrated a supporting frame for use in conjunction with electrodes of rectangular contour. However, the fundamental basic principle of the invention is the same in both instances, and consequently the invention can be practiced without any limitations with reference to the size or shape of the particular electrode to be used.

The electrode supporting means is in the nature of an article of manufacture, capable of being used indefinitely with electrodes other than the original electrode with which it is associated, when renewals or substitution of electrodes is found necessary or desirable. The supporting means shown in Fig. 1 consists of a frame including spaced parallel members 10 and 11 respectively threaded at their upper ends as at 12, and provided at their lower ends with outwardly directed hook portions 13 and 14 respectively. Wound about the spaced parallel members is a wire 15 in the form of a cylindrical helix, to accommodate an electrode of cylindrical contour in cross section and indicated at 16. The convolutions of the wire helix 15 can be spaced apart any desired distance without departing from the inventive idea, but with due regard to the protection afforded the electrode by this helix against cracking, breaking or the like. It is essential, however, that the convolutions of the helix be positively connected with the spaced parallel members 10 and 11 respectively at their points of contact, because it is by reason of this fact that a rigid and positive connection is provided, and results in a unitary structure in the nature of a frame that can be quickly and conveniently associated with or removed from the electrode 16. Also, wire 15 being connected to members 10 and 11, they are prevented from spreading apart at their lower or free ends.

When a cylindrical negative electrode is used, the ends of the latter are covered and protected by caps 17 preferably provided with serrated flanges 18 to better engage the outer peripheral surface of the electrode, and with the inner peripheral surface engaged by the convolutions of the wire coil, the electrode is strengthened and reinforced. In associating the parts, the frame above defined is slipped within the electrode 16, the latter having its lower end embraced by the hooks 13 and 14 respectively. The upper threaded ends of the spaced parallel members of the frame are passed through openings 19 of the porcelain insulating blocks 20, and are secured by nuts 21, between which and the upper surfaces of the blocks the apertured ends of a bridge piece 22 are secured. The bridge piece is bent upwardly intermediate its ends and has secured thereto a centrally upwardly extending hanger rod 23, which in practice is inserted in the central aperture of the battery jar cover (not shown), and secured thereto in any suitable manner. The insulating blocks are adapted to support positive zinc electrodes in spaced relation to the inactive electrode 16.

The wire coil 15 may be ordinarily iron wire, preferably plated with zinc, which in practice and immediately upon being submerged in the battery solution, serves to produce a local action between the wire and the copper oxide of the negative electrode, which treats and reduces the surface of the latter. This preliminary reduction of the negative electrode better serves to produce a fuller flow of electricity at the beginning of the operation of the battery. The cross section of the wire is preferably round, and therefore, while a firm engagement of the negative electrode is had to form a positive electrical contact with the wire and hanger rods, the construction is such as to permit the solution to attack the entire surface of the negative electrode.

A substantially similarly formed frame for the electrode may be also provided as illustrated in Fig. 7 of the drawings, and which differentiates from the form above described, in that the hook ends 24 of the parallel members 10 and 11 are turned inwardly, instead of outwardly, and the coiled wire helix 15 engaged upon the inner sides of the parallel members and fixed thereto in any suitable manner. With this form of the supporting frame, the cylindrical negative electrode is inserted into the coiled wire, rather than over the same as in the first form. It will of course be understood that both inside and outside coiled wires may be employed together, to support both the inner and outer cylindrical surfaces of the negative electrode without departing from the spirit of the invention.

The invention may also be used with electrodes of rectangular contour, and I have illustrated in the drawings several modifications of the invention with this object in view. In one of these modifications shown in Fig. 2, I employ a frame of inverted U-shaped formation wherein the transverse top member 25 and parallel supporting members 26—26 respectively are channeled to receive the edge of the plate form of negative electrode 27 while the wire coil 15 has its convolutions passed about the spaced opposite supporting members 26 and rigidly secured thereto in any suitable manner. This prevents the free ends of members 26 moving or being forced apart. The transverse member 25 is formed with an upwardly bent yoke 28 within which the positive electrode supporting insulating block 29 is adapted to be engaged. Each of these parallel members 26 are designed to both slidably and removably receive the negative electrode 27. While any means may be employed for holding the electrode within the frame in a manner to permit of its removal therefrom, in this specific embodiment of the invention as illustrated, I preferably reduce the parallel members 26 at the ends thereof to provide bending lugs 30 which can be quickly and conveniently bent beneath the lower edge of the electrode to hold it within the frame. A central hanger rod 31 for suspending the entire unit from the battery jar cover (not shown), is secured to the yoke 28 of the top member of the frame. The wire coil 15 wound helically about the spaced parallel members 26, and has its ends as well as each convolution effectively secured to each parallel member 26 to form a strong rigid supporting frame for the negative electrode. It is manifest from this construction that the frame in its entirety is open at one end so that the electrode can be slidably arranged within the frame, and held positioned therein an any suitable manner, to permit of its removal when desired. While the convolutions of the wire coil are herein shown secured to the outer surfaces of the parallel members 26, they may also be secured to the inner surfaces thereof, see Figs. 3 to 7 inclusive without departing from the inventive idea. The parallel members 26 of the frame thus extend along the opposed sides or faces of the negative electrode, and after the latter has been arranged within the frame it is effectively engaged on all sides and edges by the latter.

In the modifications shown in Figs. 3 to 6 inclusive, I have shown the frame as consisting of a transverse top member 32 which is of somewhat the same construction as the member 25 hereinabove referred to, in that it is formed with a centrally located yoke 33 adapted to receive the head of the central hanger rod 31. The frame also of both of these forms includes spaced parallel supporting members which are of U-shaped formation similar to the members 26 hereinabove described. In Fig. 3 of the invention the U-shaped supporting members 34 are disposed vertically and secured directly to the top transverse member 32 and thus serves to support a wire coil 15 disposed within and secured to said U-shaped member.

The supporting members 35 shown in Figs. 4 and 5 are arranged to extend horizontally across the opposed sides or faces of the plate form of negative electrode 27, in contradistinction to the vertical arrangement of the supporting members 34 shown in Fig. 3. The frame also includes a wire coil 36, the convolutions of which are arranged vertically, passing over the upper transverse member 32 and below the lowermost supporting member 35. These convolutions are also rigidly connected to the top supporting member 32 and to each of the supporting members 35 at every point where these parts contact, thus providing a strong and rigid supporting frame for the negative electrode. In these forms of the invention the frame is open along at least one edge to slidably receive the negative electrode, while the free ends of the supporting members form bendable lugs 37 which can be bent into engagement with the adjacent edge of the negative electrode to hold the latter properly positioned within the frame. In this form of the invention the frame is broader through its upper portion than its lower portion to accommodate plates of like dimension. The frame also contacts both faces and every edge of the negative electrode, and at the same time permits the latter to be quickly and conveniently removed from the frame as the occasion may require, so that a renewal or substitute electrode can be used in its place.

In all of these forms of the invention which are designed for use in connection with electrodes of rectangular contour, it will be observed that the supporting frame is designed to embrace four or more sides of the electrode, as the frame has been designed as a protecting means for the electrode, as well as designed to permit the electrode to be replaced by renewal or substitute at any time found necessary or desirable. It will also be noted that the means employed for holding the electrode within the frame in a manner to permit of its removal, forms an integral part of the frame itself, thereby not only adding to the strength and rigidity of the entire supporting structure, but also effecting the cost of manufacture of the article.

While it is believed that from the foregoing description the nature and advantages of the invention will be readily apparent, I desire to have it understood that what is herein shown and described is merely illustrative, and to which I do not limit myself, as such changes may be resorted to when desired as fall within the scope of what is claimed.

What is claimed is:

1. As a new article of manufacture, an electrode support comprising a frame including spaced parallel supporting members, a wire coiled about said members and having its convolutions spaced apart and rigidly secured to said members at their points of contact, an electrode smaller than the inside dimensions of the supporting frame, said frame being designed to slidably receive an electrode and permit of its removal therefrom, and means forming an integral part of said supporting members for holding an electrode associated with the frame.

2. As a new article of manufacture, an electrode support comprising a frame having spaced parallel supporting members, an electrode, said frame designed to embrace the electrode and open to slidably receive the electrode and permit of its removal therefrom, a wire coiled about said parallel members and rigidly connected therewith, and means forming an integral part of said members for holding the electrode associated with the frame.

3. As a new article of manufacture, an electrode support comprising a frame including spaced parallel members, an electrode, a wire coiled about said members and having its convolutions rigidly connected therewith to define a frame open to slidably receive an electrode, and permit of its removal therefrom, and lugs carried by said parallel members to engage the adjacent edge of the electrode and support the latter associated with the frame.

4. As a new article of manufacture, an electrode supporting frame including spaced parallel supporting members, an electrode, a wire coiled about said members and rigidly secured thereto, and defining a frame-like structure designed to embrace an electrode on four or more sides, said frame being open to slidably receive an electrode and permit of its removal therefrom, and bendable lugs forming part of said parallel members and adapted to engage the adjacent edge of the electrode to hold the latter associated with the frame.

5. An elecrode support including a unitary wire basket frame, an electrode, said frame having an opening larger than the electrode, adapted to slidably receive said electrode, and permit its removal therefrom, said frame including a pair of arms, integral supporting means for holding said electrode within said support, and means connecting said arms for preventing the open end of said frame from spreading.

6. An electrode support including a unitary wire frame structure, an electrode, said frame having an opening larger than the electrode, adapted to embrace said electrode and to slidably receive the electrode and permit its removal therefrom, said frame including a pair of arms, means forming an integral part of said frame for holding the electrode within the latter, and means connecting said arms for preventing open end of said frame for spreading.

7. An electrode support including a frame, a wire coiled around the frame and having its convolutions spaced and rigidly secured to the frame at point of contact, said frame having an opening at least as large as an electrode and being designed to slidably receive an electrode and permit of its removal therefrom, and means for holding an electrode positioned within said frame.

8. An electrode support including spaced parallel members, a wire coiled around said members and rigidly connected therewith at their points of contact, and defining therewith a frame-like structure having an opening at least as large as an electrode, said opening being designed to receive an electrode and permit its removal therefrom, and means for holding an electrode within said support.

9. As a new article of manufacture an electrode support including spaced parallel members, a wire coiled about said members and having its convolutions rigidly connected therewith to define a frame having an opening at least as large as an electrode to slidably receive an electrode and permit of its removal therefrom, and means carried by said supporting members of the frame for holding an electrode associated with the frame, said means being operable to permit removal of the electrode from the frame.

10. As a new article of manufacture, an electrode support comprising a unitary wire basket frame including a coil adapted to surround and engage the electrode, said frame having an opening at least as large as the electrode adapted to slidably receive and permit the removal of the electrode from the frame, and bendable end portions forming an integral part of the frame arranged to retain the electrode within the frame, and to permit removal of the electrode from the frame.

11. As a new article of manufacture, an electrode support comprising a wire basket frame, an electrode, said frame having an opening at least as large as the electrode and including spaced parallel supporting members designed to embrace the electrode and to slidably receive the electrode and permit its removal therefrom, and a wire coiled about said parallel members and rigidly connected therewith.

12. As a new article of manufacture, an electrode support comprising a wire basket frame, an electrode, said frame having an opening at least as large as the electrode and including spaced supporting members, a wire having its convolutions spaced apart and contacting with said members and rigidly secured thereto at their points of contact, said frame designed to receive an electrode and permit of its removal therefrom.

Signed at Waterbury in the county of New Haven and State of Connecticut this 8th day of November, A. D. 1928.

MARTIN L. MARTUS.